May 15, 1956 V. T. NORWOOD 2,746,035
RADAR REFLECTOR

Filed June 4, 1951 2 Sheets-Sheet 1

*INVENTOR.*
VIRGINIA T. NORWOOD
BY
*Harry M. Saragovitz*
*Attorney*

May 15, 1956 V. T. NORWOOD 2,746,035
RADAR REFLECTOR
Filed June 4, 1951 2 Sheets-Sheet 2

INVENTOR.
VIRGINIA T. NORWOOD
BY
*Harry M. Saragovitz*
ATTORNEY

United States Patent Office 2,746,035
Patented May 15, 1956

2,746,035

RADAR REFLECTOR

Virginia T. Norwood, Red Bank, N. J., assignor to the United States of America as represented by the Secretary of the Army Application June 4, 1951, Serial No. 229,858

6 Claims. (Cl. 343—18)

(Granted under Title 35, U. S. Code (1952), sec. 266)

The invention described herein may be manufactured and used by or for the Government for governmental purposes, without the payment of any royalty thereon.

The present invention relates to a device for reflecting electromagnetic waves. More particularly, the invention relates to a trihedral corner assembly capable of reflecting ultra-high frequency radiant energy with the reflecting surfaces so arranged as to present strong multi-directional reflective properties from most aspects.

In the past there have been designed corner reflectors, also known as trihedral reflectors, comprising three planar reflecting elements mounted in mutually perpendicular relationship to form a trihedral angle. The principal property of a trihedral reflector is that any incident ray, if reflected by any, or all of the three plane elements of the reflector in succession, emerges from the reflector in a direction parallel to its direction of incidence. By virtue of such property, a ray incident upon the reflector from any direction may be reflected back to its source.

In accordance with my invention, the reflective properties are greatly intensified by the unique form of construction of the reflector hereinafter described.

Accordingly, the objects of the invention are to provide a corner reflector that has strong reflective properties; that will result in few nulls or no responses to reflectivity, that is simple to manufacture and assemble and relatively inexpensive to produce, an important factor in view of the fact that in many instances such reflectors are used but once for individual tests.

Another object of the invention is to provide a reflecting device composed of eight corner reflectors, each of said corner reflectors comprising a trihedral angle having three mutually perpendicular plane surfaces and characterized by having two sets of four reflectors back-to-back in asymmetrical relationship to each other. Additional features will be apparent to those persons skilled in the art.

The novel features of the invention are defined in the appended claims and an illustrative embodiment of the invention is shown in the accompanying drawing in which:

Figure 1:
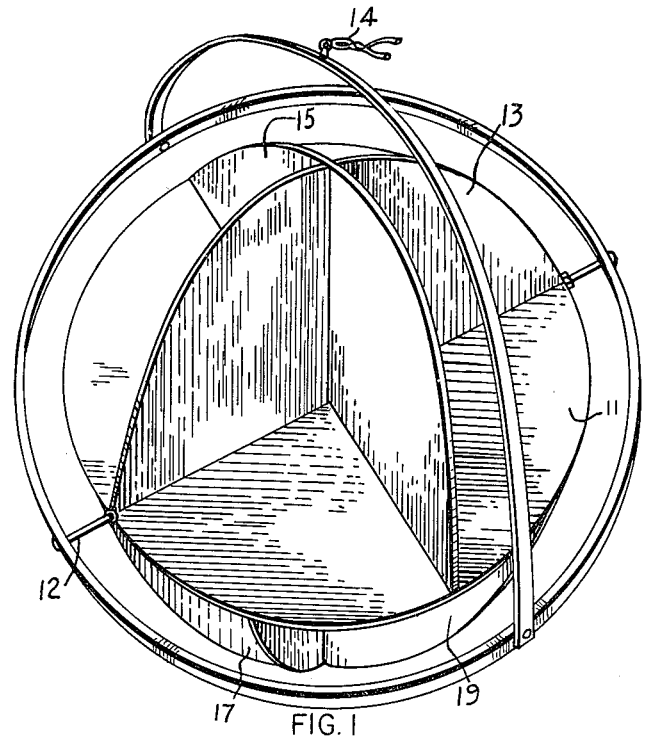
Figure 1 is a perspective view of one embodiment of a reflector embodying the principles of the invention.
Figure 3:
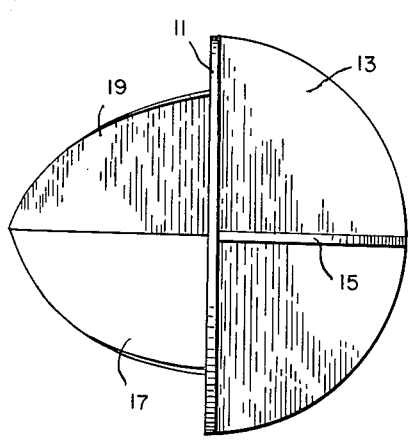
Figure 3 is a side view of the reflector as shown in Figure 2.
Figure 2:
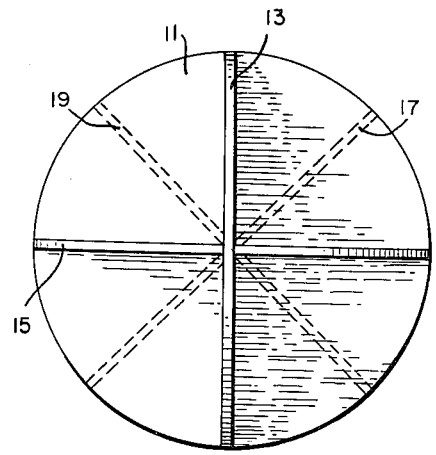
Figure 2 is a top view of the reflector of Figure 1.

Referring to the drawing, the reflector comprises a disk 11 which serves as the foundation or body upon which the remainder of the reflector is assembled. Mounted on one surface of the disk 11 are two medially intersecting semi-circular elements 13, 15, which are perpendicular to the disk 11 and perpendicular to each other, thereby forming four trihedral reflectors, each having three planar reflecting surfaces. Preferably elements 13 and 15 are of unitary or undivided construction and if so constructed, each of the elements 13, 15 is provided with a half radial slot to permit interlocking of the elements. However, if preferred, four separate quadrantal segments or sections can be assembled, and suitably secured to form the patterned structure as shown.

Similarly mounted on the other surface of the disk 11 are two medially intersecting semi-circular elements 17, 19 which are perpendicular to the disk 11 and to each other, thus forming a geometric pattern identical to that on the opposite surface and likewise providing four trihedral reflectors, as shown, and formed by the elements 13, 15. As seen in the drawing, elements 13 and 15 intersect to form an intersecting axis normal to disk 11, that is in alignment with an intersecting axis formed by the intersection of elements 17, 19. However, as shown in the various figures of the drawing, the elements 17, 19 are not in symmetry with the elements 13, 15, but as seen are so positioned that each quadrantal segment of the elements 17, 19 is spaced 45° from the two quadrantal segments of elements 13, 15 immediately above said first mentioned quadrant. Accordingly, each of the trihedral reflectors on one surface of the disk 11 are askew in relation to each of the trihedral reflectors on the opposite surface of disk 11.

The amplitude of the echo of any form of signal projected onto a trihedral reflector will be found to vary within rather wide limits in accordance with the direction of any type of transmitter-receiver device for the signal such as, for example, a radar set, hereinafter referred to as a source. If the source is directly on one of the axes of the trihedral reflector the plane at right angles to this axis will provide a good reflection; if the signal is in one of the planes and substantially at the center of the dihedral, there will also be a good echo due to the dihedral effect; and if the signal is substantially at the center of the trihedral angle the trihedral effect serves to provide a maximum reflection. However, if the angle of the signal is close to one of the planes the small projected area of that plane greatly reduces the echo signal. A trihedral reflector involves three possible types of reflection in varying proportions depending on the source direction (1) single plane reflection with signal and echo both in a reference plane established thru a line normal to the reflection plane (2) dihedral reflection-reference plane thru dihedral line (3) trihedral reflection-signal and echo always superposed as desired. The single plane reflection is effective only if the source is on the normal line (one of the trihedral axes), while dehedral reflection is effective only if the source is in a plane normal to the dihedral line (one of the trihedral planes), otherwise these reflections are lost as far as the transmitter-receiver is concerned.

Figure 4:
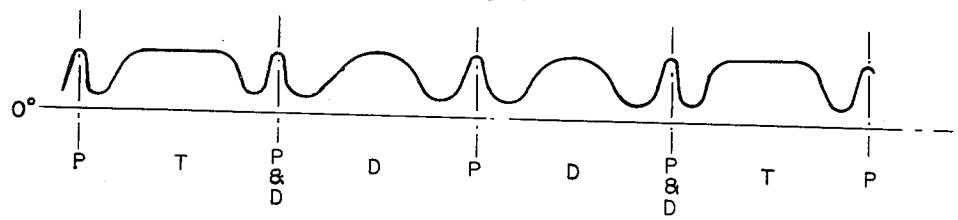
Figures 4, 5 and 6 are typical echo response patterns of this trihedral reflector with dotted lines showing corresponding patterns of conventional reflectors.
Figure 5:
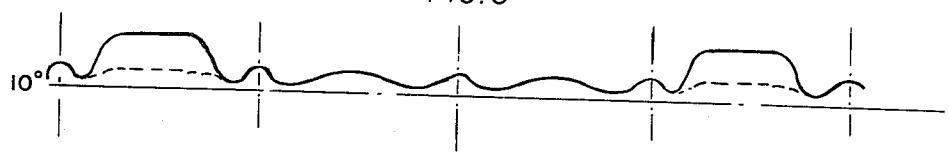
Figure 6:
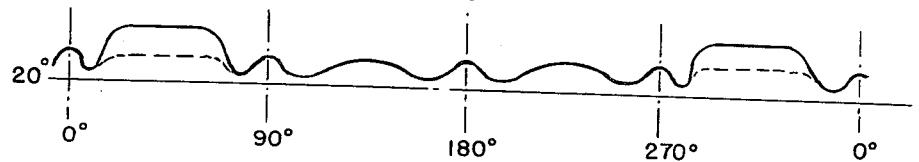

The effect of these phenomena on the signals returned by a reflector with the trihedral angles askew, as in Fig. 1, is shown by the curves in Figures 4, 5, and 6. Fig. 4 represents the amplitude of echo from a signal on the common or most nearly vertical axis in Fig. 1, as the reflector rotates one full turn about the axis by which it is supported in the gimbals. Similarly Figs. 5 and 6 represent the amplitude of echoes from a source approximately 10 degrees and 20 degrees respectively, displaced from such common axis toward such axis of rotation. It is apparent that the signal on the common axis receives good echoes a substantial part of the time, either by direct reflection from the single planes of the upper portion of the reflector, by dihedral effect of the planes 11 and 13, or planes 17 and 19, or by trihedral effect of such reflections being identified as "P" planar, "D" dihedral, and "T" trihedral. On the other hand, a signal slightly displaced from the common axis will still receive a good echo from the trihedral reflector formed by planes 11, 17, and 19 during one part of the rotation even though the projected area of plane 15 will be so small that the reflected signal will be very weak during other portions of the rotation. If the planes 17 and 19 were not askew relative to the planes 13 and 15, the echoes might repeatedly be very weak as indicated by the dotted lines in Figs. 5 and 6 and tracking of the reflector might fail; when tracking fails the reflector may be lost entirely as there is considerably more difficulty to re-detect the reflector than to follow it steadily.

The percentage of low energy reflections from the various possible directions cannot be changed, but the probability of repeated low energy reflections is greatly reduced. Devices of the prior art having three equivalent natural axes with one plane perpendicular to the rotation about any one axis did not solve the problem of low energy reflections near a right angle thereto. The reflector of the present invention has but one such natural axis; rotation about any other axis greatly reduces the probability of repeated low energy reflections.

As the type of reflector herein described is often raised into the atmosphere by securing it to a gas filled balloon, it is preferred that the framework of the reflector be made of a material that is extremely lightweight, such as lightweight plastic, Balsa wood or the like. Each trihedral reflector framework is then covered with aluminum foil, tin foil, metallized fabric, reflective paints or any material capable of reflecting radiant energy impinged upon any surface of the reflector. If desired, the reflector may be tied to a parachute and released from an airplane for descent to the ground. In order to utilize fully, all of the reflective corners, the reflector should be permitted to rotate or tumble freely in all directions. This can be accomplished by providing gimbals 12 or universal joints at oppositely disposed points on disk 11 and by securing the tie-line 14 of the parachute or balloon to said gimbals or joints.

Having thus described the invention, what is claimed as new is:

1. A corner reflector for radiant energy comprising two sets of trihedral angles back-to-back, each set comprising four right trihedral angles about a common axis of intersection, one set being angularly askew about the common axis relative to the other of said sets and means operably associated with said reflector to permit said reflector to rotate freely.

2. A reflector for radiant energy comprising a plate, an assembly of four trihedral angles on each side of said plate, each assembly of trihedral angles having a common intersecting axis, the axes of the two assemblies being in alignment, one assembly being angularly askew about said intersecting axis relative to the other assembly and means operably associated with said reflector to permit said reflector to rotate freely.

3. A device for reflecting electro-magnetic waves, comprising a reflector having eight three-sided sections, one side of each of said sections being a plate common to all of said sections, each of said sections consisting of three plane surfaces normal to each other, four of said sections being disposed about one surface of said plate, the remaining four sections being disposed about the opposite surface of said plate in asymmetrical relationship to the other of said four mentioned sections and means operably associated with said reflector to permit said reflector to rotate freely.

4. A device for reflecting electro-magnetic waves, comprising a reflector having eight three-sided sections, one side of each of said sections being a plate common to all of said sections, each of said sections consisting of said plate portion and two side elements normal to said plate portion and to each other, four of said sections being disposed about one surface of said plate, the remaining four sections being disposed on the opposite surface of said plate and having each of said side elements spaced 45° from the side elements of its opposing section and means operably associated with said reflector to permit said reflector to rotate freely.

5. A reflector of the kind set forth in claim 3 wherein said last mentioned means comprises a pair of gimbals affixed to said plate.

6. A reflector of the kind set forth in claim 4 wherein said last mentioned means comprises a pair of gimbals affixed to said plate.

References Cited in the file of this patent

UNITED STATES PATENTS

| | | |
|---|---|---|
| 405,354 | Hawk | June 18, 1889 |
| 2,452,822 | Wolf | Nov. 2, 1948 |
| 2,463,517 | Chromak | Mar. 8, 1949 |